(12) United States Patent
Montie et al.

(10) Patent No.: US 8,291,763 B1
(45) Date of Patent: Oct. 23, 2012

(54) PUSH-IN-SNAP MOUNTING BRACKET FOR GAUGE

(76) Inventors: Doug Montie, Norwich, CT (US); Kevin Terry, Uncasville, CT (US); Gjergji Karanxha, Waterford, CT (US)

( * ) Notice: Subject to any disclaimer, the term of this patent is extended or adjusted under 35 U.S.C. 154(b) by 0 days.

(21) Appl. No.: 12/799,446

(22) Filed: Apr. 26, 2010

Related U.S. Application Data

(60) Provisional application No. 61/274,470, filed on Aug. 18, 2009.

(51) Int. Cl.
*G01D 11/24* (2006.01)

(52) U.S. Cl. .......................................................... 73/431

(58) Field of Classification Search .................... 73/431; 248/27.1, 27.3
See application file for complete search history.

(56) References Cited

U.S. PATENT DOCUMENTS

| | | | |
|---|---|---|---|
| 2,424,757 A | 6/1945 | Klumpp | |
| 2,616,944 A | 11/1952 | Bedford | |
| 3,079,581 A | 2/1963 | Klumpp | |
| 3,390,903 A | 7/1968 | Sabonis | |
| 3,794,278 A * | 2/1974 | Frey et al. | 248/27.3 |
| 3,842,709 A | 10/1974 | Fuqua | |
| 3,942,226 A | 3/1976 | Barnett | |
| 6,203,240 B1 | 3/2001 | Hironaka | |
| 6,244,107 B1 * | 6/2001 | Nelson et al. | 73/431 |
| 6,300,563 B1 | 10/2001 | Kerchaert | |
| 6,854,350 B2 * | 2/2005 | Ayres | 73/866.3 |
| 6,938,859 B2 | 9/2005 | Beausoleil | |
| 7,325,775 B2 * | 2/2008 | Chen | 248/27.1 |
| 7,415,891 B2 | 8/2008 | Santos et al. | |
| 2007/0131520 A1 | 6/2007 | Saunders | |
| 2009/0168307 A1* | 7/2009 | Loy et al. | 361/659 |

* cited by examiner

*Primary Examiner* — Lisa Caputo
*Assistant Examiner* — Jamel Williams
(74) *Attorney, Agent, or Firm* — Mark E. Pochal

(57) ABSTRACT

A gauge mounting assembly for mounting a gauge to an instrument panel of a vehicle such as an automobile, boat, airplane or any other device utilizing said gauge and instrument panel. The gauge mounting assembly comprises: a gauge disposed within a gauge housing abutting a gauge housing flange; a gauge mounting bracket integrally attached to the gauge housing; said gauge mounting bracket comprising a circular base with a series of flexible fingers extending axially from said base; and, said fingers consisting of a ratcheting tip. When said gauge mounting assembly is positioned within a hole in said instrument panel the flexible fingers consist of an elastic dual-action cantilevered spring members. First, said fingers flex inwardly towards the axial surface of the gauge housing to permit passage through said hole. Second, said spring members bow outwardly from their original position exerting an outward force against said hole maintaining retention and alignment of the gauge housing. The ratcheting tips of the flexible fingers distal from said base become trapped on a opposite rear surface of said instrument panel, corresponding to the thickness, sandwiching the instrument panel between the gauge housing flange and corresponding ratcheting tips creating an exponential resistance in removal force created by the bowed shaped configuration of the spring members and automically centering the gauge device within the hole of the instrument panel without the need of a additional element.

5 Claims, 6 Drawing Sheets

PUSH-IN-SNAP MOUNTING BRACKET FOR GAUGE

This application claims benefit of a provisional patent application Ser. No. 61/274,470, filed Aug. 18, 2009.

TECHNICAL FIELD

The present invention relates to devices for mounting a gauge to an instrument panel of any vehicle requiring the use of gauges such as an automobile, a boat, or an airplane.

BACKGROUND

Gauges of all sorts indicating the amount of fuel, temperature of an engine, oil pressure, speed and indicators of other various parameters are commonly mounted to an instrument panel of a variety of vehicles, including but not limited to automobiles, boats or airplanes. A typical method of mounting said gauges requires an annular gauge housing with a thin flange at one end and a cylindrical or conical body that is placed into a hole in a instrument panel. A U-shaped or cup shaped mounting bracket is attached to the housing from the backside of the instrument panel sandwiching the instrument panel between the gauge housing flange and the mounting bracket. The mounting bracket can be attached to the gauge housing in a variety of ways. The most common method of mounting a gauge is by use of mounting studs assembled to the gauge housing. The mounting bracket is provided with holes through which the mounting studs pass. The gauge is inserted from the front through the hole in the panel and the mounting bracket is passed over the mounting studs from the backside of the panel. Mounting nuts are screwed onto the studs and tightened against the mounting bracket to sandwich the instrument panel between the gauge housing flange and the mounting bracket.

A second method of mounting a gauge comprises a screw thread on the outer wall of the gauge housing and a corresponding screw thread on the inner wall of the mounting bracket. The gauge is inserted through the opening in the instrument panel and the bracket is screwed onto the gauge housing from the backside to sandwich the panel between the gauge housing and bracket. In order to accommodate various thickness panels extending threading on either the mounting studs or gauge housing is required. This results in an ergonomically difficult and time-consuming operation.

A third typical method of mounting consists of using a smooth wall gauge housing and an internally toothed mounting bracket. This mounting bracket has tapered internal threads, and a separate metal ring that travels in this thread. The separate metal ring has protrusions similar to saw teeth. The gauge is inserted through the opening in the instrument panel as with the previous methods, and the bracket is pushed from the rear around the gauge housing and tight up against the instrument panel. Twisting the bracket in a clockwise manner engages the internally captive toothed ring against the gauge housing, and further tightening causes this member to draw the gauge housing tight up against the instrument panel. This method produces a number of stress riser points on the exterior wall of the gauge housing where the teeth of the metal toothed ring component contact the housing wall. Additionally, the tapered threads of the bracket place a significant inward radial hoop stress on the gauge housing and the mechanical advantage of the screw thread places a large axial load on the thin flange of the gauge housing. The combination of stress risers and applied stresses can potentially cause the gauge housing to fail at the flange.

A fourth method of mounting gauges to instrument panels uses a specially molded plastic housing that has four flexible flaps extending tangentially from the round base portion, the flaps being free to flex radially inward towards the base portion to permit passage of the flap through the opening in a panel. Each of the flaps has a stepped edge surface facing the flange, the axial spacing between a tread portion of each step and the flange decreasing going from a radially outermost step to a radially innermost step, and the tread portion of each step defining a respective panel abutting surface for abutting the rear side of the panel. The relatively large distance between the tread portions of each step limits this method of mounting limits to a specific dimensional thickness that corresponds to the corresponding dimensions of the tread steps. If the panel thickness does not correspond to the dimensions of the tread portions the gauge housing is not tightly secured to the panel resulting in the gauge being allowed to move excessively when the gauge is placed in vibration.

SUMMARY

An object of the invention is to provide a mounting bracket that will allow the user to quickly mount a gauge to an instrument panel without the use of any additional hardware, or special tools. A further object of the invention is to provide a universal mounting bracket that will work with various thickness mounting panels. A further object of the invention is to provide a universal mounting bracket that will both compensate for normal manufacturing variations in mounting hole diameters and also provide a method for centering the gauge in the panel mounting hole. A further object of the invention is to provide a mounting bracket that will work with various existing standard gauge housings. A further object of the invention is to allow a number of different electrical connector types to be added to existing standard gauge housings.

In accord with the invention, the gauge mounting bracket is comprised of a series of flexible fingers that extend axially from a base of the gauge mounting bracket. Each of the series of flexible fingers configured to provide a ratcheting tip distally from the base. The gauge mounting bracket is assembled to a gauge housing either during manufacture of the gauge or at some other time by a means for assembly. The gauge mounting bracket becomes an integral part of the gauge. As the gauge and integral gauge mounting bracket are placed through a hole in the front side of the instrument panel the flexible fingers on the gauge mounting bracket flex inward toward the gauge axial center to allow the gauge to pass through the hole in the instrument panel. After the gauge is placed through the hole to a position where a gauge housing flange abutting the gauge rests on the front surface of the instrument panel, the spring members of flexible fingers on the gauge mounting bracket bow outwardly trapping the ratcheting tip against the instrument panel centering the gauge in the gauge panel hole and providing a tight fit by creating a spring force against the opposite rear surface of the instrument panel sandwiching the instrument panel between the gauge housing flange and the series of flexible fingers of the gauge mounting bracket.

The foregoing and other objects, features and advantages of the present invention will become more apparent from the following description of preferred embodiments and accompanying drawings.

DETAILED DESCRIPTION OF THE INVENTION

Figure 1:
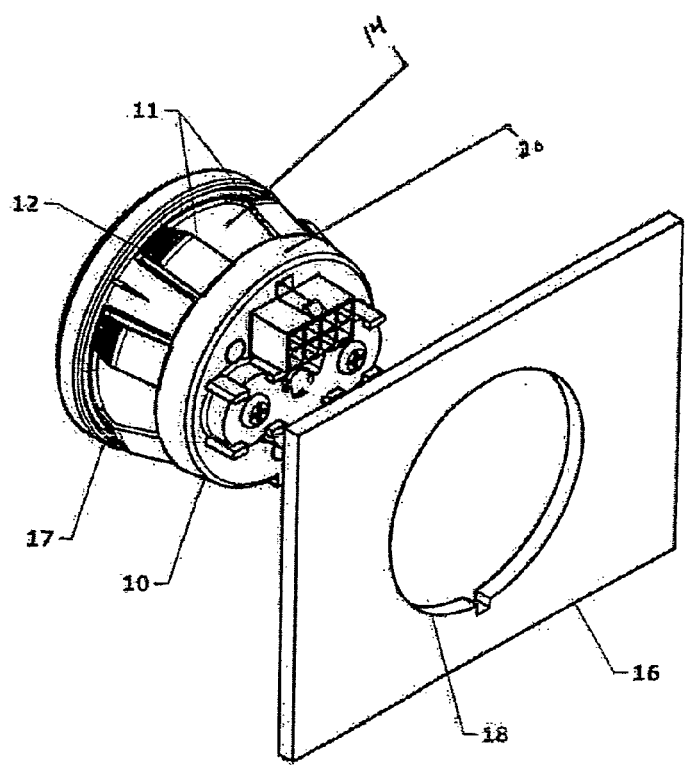
FIG. 1. Is a perspective view of the gauge mounting bracket integral to the gauge housing and gauge for Insertion through a hole in an instrument panel.

The invention is principally described in FIG. 1 which is a perspective view of the gauge mounting bracket 10 integrally assembled to gauge housing 14. Gauge 17 is disposed within gauge housing 14 abutting a gauge housing flange 19. Gauge mounting bracket 10 comprises a series of flexible fingers 11 which extend axially from base 20 of gauge mounting bracket 10. Gauge mounting bracket 10 and gauge housing 14 with gauge 17 are inserted within the front side of instrument panel 16 through hole 18 in instrument panel 16.

Figure 2:
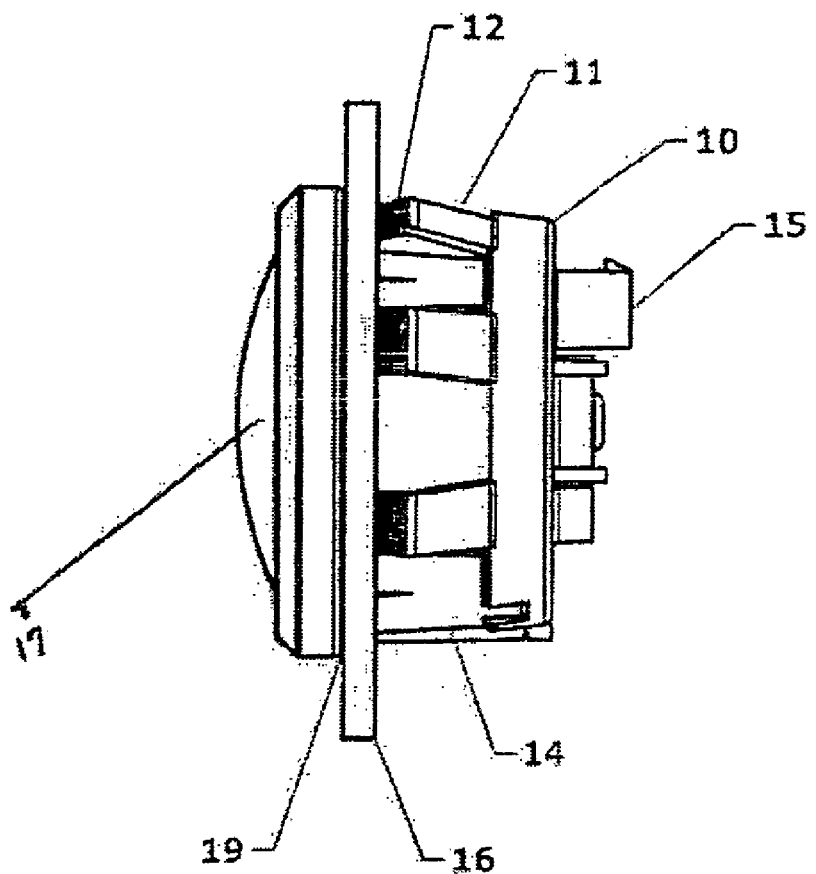
FIG. 2. Is a perspective view of the gauge, gauge housing and integral gauge mounting bracket positioned within a hole in an instrument panel.

FIG. 2 shows gauge 17 with gauge housing 14 and integrally attached gauge mounting bracket 10 placed through hole 18 in instrument panel 16 to a location in which a thin flange 19 of gauge housing 14 rests on the surface of instrument panel 16.

Figure 3:
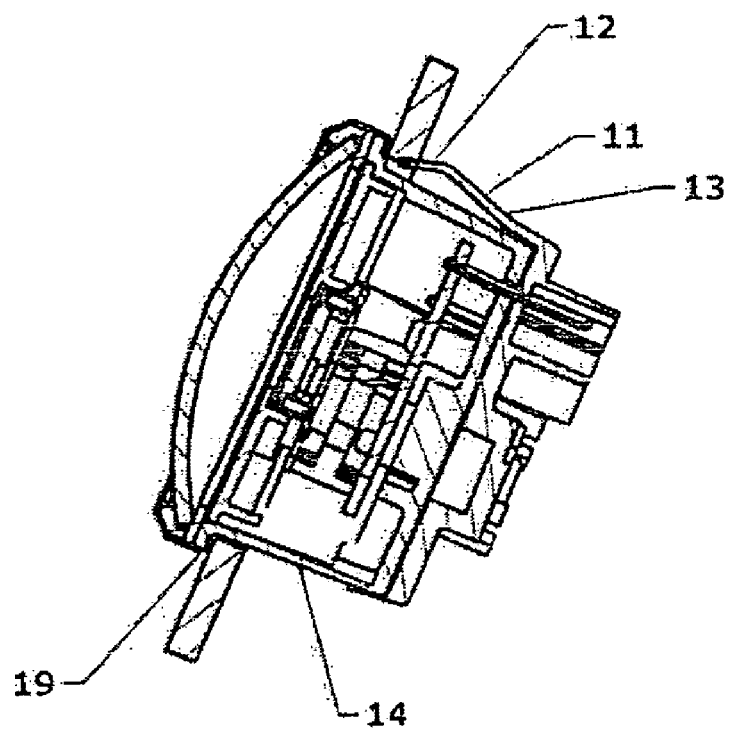
FIG. 3. Is a section orthographic view showing the profile of the series of flexible fingers of the gauge mounting bracket.
Figure 4:
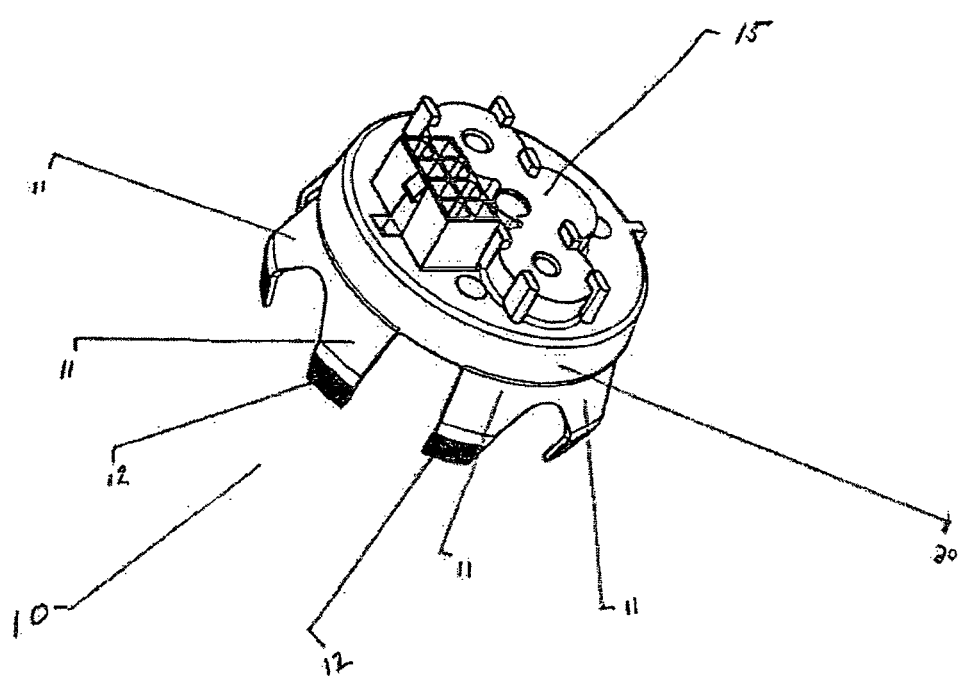
FIG. 4. Is an isolated view of the base of the gauge mounting bracket and the series of flexible fingers extending axially from the base.
Figure 6:
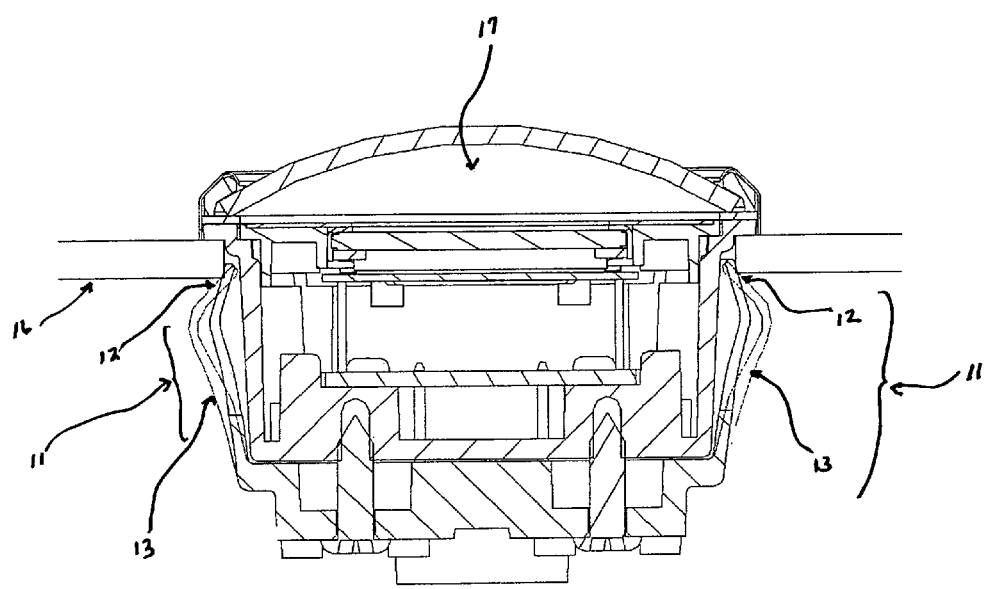
FIG. 6. Is a perspective view of the gauge and gauge housing disposed within an instrument panel illustrating the bowed shaped configuration of the spring members.

FIG. 3 is a sectional orthographic view showing the typical profile of the series of flexible fingers 11 and explains the mechanism of the gauge mounting bracket 10. Each of the series of flexible fingers 11 as illustrated in FIGS. 3 and 4 is provided with a ratcheting tip 12 distal from base 20. The profile of the flexible fingers 11 is designed so that they form a elastic limb dual-action cantilevered spring members 13, which in the installed condition act as leaf springs. As illustrated in FIG. 6, when placing gauge 17 with attached gauge mounting bracket 10 through hole 18 in instrument panel 16 then the series of flexible fingers 11 flex inwardly toward gauge 17 axial center to allow passage through hole 18. Thereafter, the spring members 13 of the series of flexible fingers 11 of the gauge mounting bracket 10 bow outwardly and conform into a bowed configuration trapping the ratchet tip 12 against the opposite rear surface of instrument panel 16. The resulting spring force exerted outwards against the hole 18 in the instrument panel 16 creates an exponential resistance in removal force. The ratcheting tip 12 on each of the flexible fingers 11 corresponding to the thickness of instrument panel 16 rests on the opposite rear surface on instrument panel 16 sandwiching the instrument panel 16 between the gauge housing flange 19 and the corresponding tip 12 on each of the series of flexible fingers 11 of the gauge mounting bracket 10. If gauge device 17 is pressed back out from hole 18, spring members 13 become increasing bowed in shape creating an increased resistance force against removal of gauge housing 14. Additionally, the bowed configuration of spring members 13 created from exertion into hole 18, causes a diametrical force automatically centering the gauge device 17 within hole 18.

The gauge mounting bracket 10 and series of flexible fingers 11 as illustrated in FIG. 4, in the preferred embodiment are manufactured from a thermoplastic material.

FIG. 4 illustrates an electrical connector type 15 which may be molded as an integral part of gauge mounting bracket 10. A variety of different style electrical connector types 15 may be integrally molded or assembled to gauge mounting bracket 10 at a later time in alternate preferred embodiments.

Figure 5:
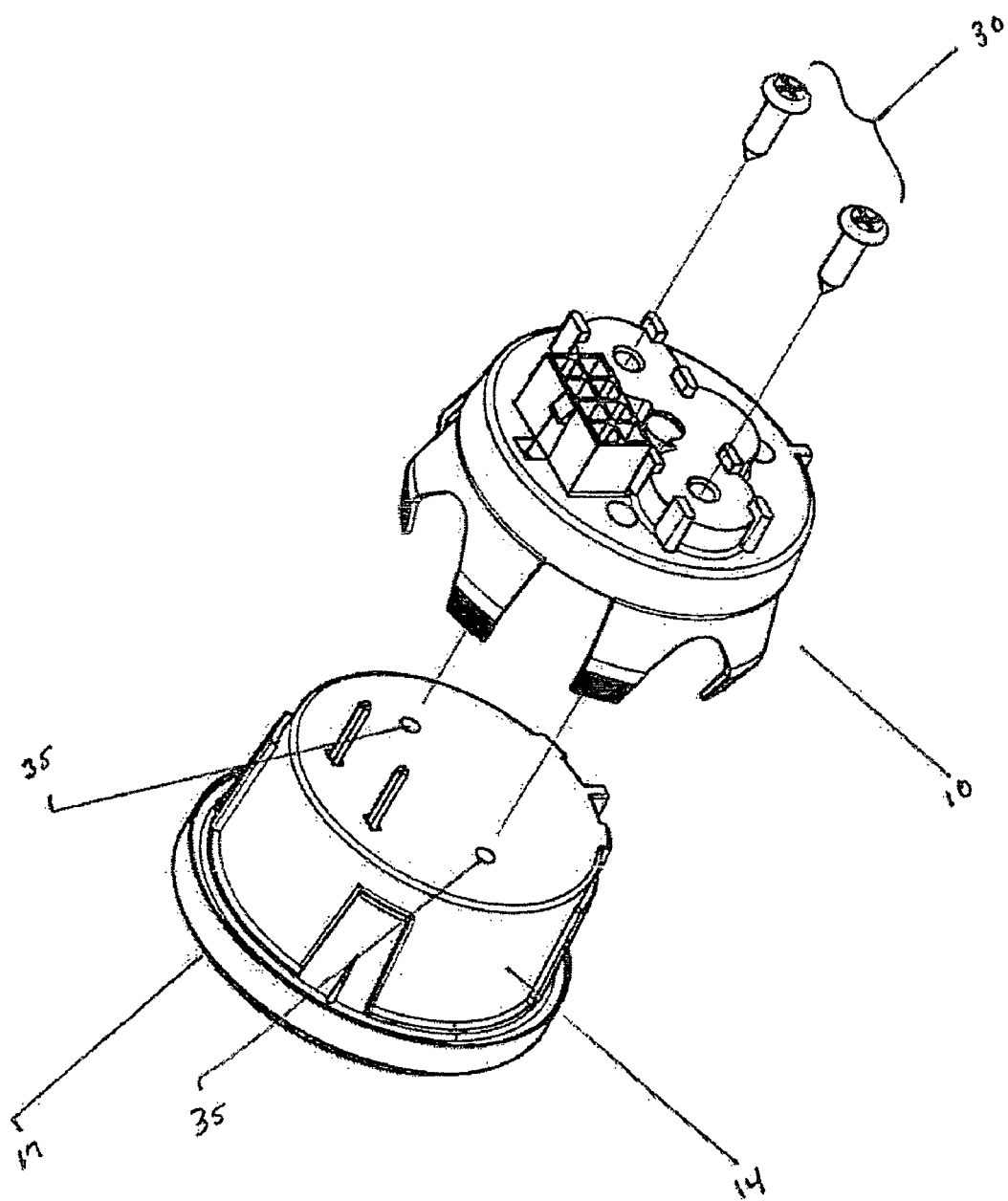
FIG. 5. Is a perspective view a means of assembly of the gauge mounting bracket to the gauge housing.

FIG. 5. Illustrates an alternative means of assembling gauge mounting bracket 10 to gauge housing 14. In this preferred embodiment the means of assembly is by use of a means of attachment 30, included but not limited to screws or rivets extending through gauge mounting bracket 10 to corresponding receivers 35 in gauge housing 14. In a preferred embodiment the gauge mounting bracket 10 is assembled to the gauge housing 14 during the manufacturer of gauge 17.

Although this invention has been shown and described with respect to some embodiments, it will be understood by those skilled in this art that various changes in form and detail thereof may be made without departing from the spirit and scope of the claimed invention.

We claim:

1. A gauge mounting bracket for mounting a gauge disposed within a gauge housing and abutting a gauge housing flange to a front side of an instrument panel, said gauge mounting bracket comprising:
   a circular base;
   a series of identical flexible fingers extending axially from said base;
   a means of assembly of said circular base and said series of flexible fingers integral to said gauge housing;
   a ratcheting tip at a free end of said flexible fingers positioned distally from said base, said ratcheting tip becoming trapped against a rear surface of said instrument panel after insertion of the gauge housing in a hole of said instrument panel; and,
   an elastic dual-action cantilevered spring member of said flexible fingers exerting an outward force against a hole in said instrument panel by deformation of said spring member into an outwardly bowed shape configuration when said ratcheting tip is trapped against said rear surface of said instrument panel sandwiching said gauge housing flange against said instrument panel and aligning said gauge device disposed within said gauge housing.

2. The gauge mounting bracket of claim 1, wherein said gauge bracket is manufactured from a thermoplastic material.

3. The gauge mounting bracket of claim 1, wherein said circular base comprises electrical connector devices on said circular base.

4. The gauge mounting bracket of claim 1, wherein the gauge device is disposed within the gauge mounting bracket as a permanent unit during manufacturing.

5. The gauge mounting bracket of claim 1, wherein the gauge device is disposed within the gauge mounting bracket by an attachment means.

* * * * *